United States Patent [19]
Banks

[11] 3,994,265
[45] Nov. 30, 1976

[54] SAFETY CAT COLLAR
[75] Inventor: Lillian Banks, Massapequa, N.Y.
[73] Assignee: Lawrence Peska Associates, Inc., New York, N.Y. ; a part interest
[22] Filed: Aug. 21, 1975
[21] Appl. No.: 606,663

[52] U.S. Cl. .............................. 119/106; 24/221 R
[51] Int. Cl.² ........................................ A01K 27/00
[58] Field of Search........... 119/106, 110; 24/221 R, 24/201 A, 230 TC

[56] References Cited
UNITED STATES PATENTS

| | | | |
|---|---|---|---|
| 424,197 | 3/1890 | Harrison | 119/106 |
| 2,900,696 | 8/1959 | Bacon | 119/106 X |
| 3,540,091 | 11/1970 | Marosy | 24/221 R |

Primary Examiner—Hugh R. Chamblee

[57] ABSTRACT

A safety collar for cats having an adjustable neck-encircling band including a pressure releasable fastener. The fastener includes a socket type keeper member on one end of the band receiving a bolt member on the other end of the band. The keeper member has a restricted circular entrance including a radial slot opening into an internal cavity. The bolt member on one end has a ball larger than the circular entrance with a pin radially disposal in the ball and adapted to be received through the slot when the ball is forced through the entrance. The bolt at its other end is pivotably mounted in the band for aligning the pin with the slot for entry into the cavity and for release therefrom should the collar catch on some object, and for rotating the pin approximately normal to the slot for use as a conventional leash.

5 Claims, 4 Drawing Figures

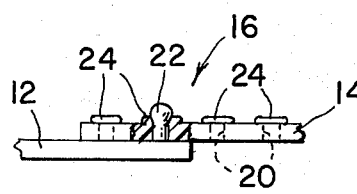
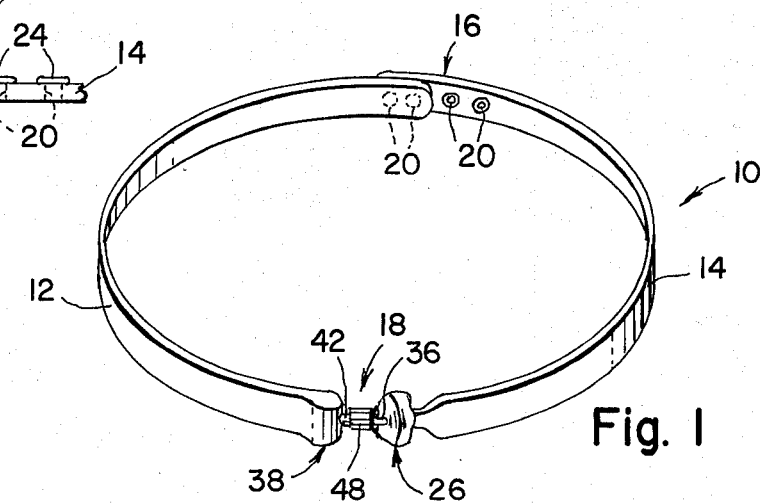
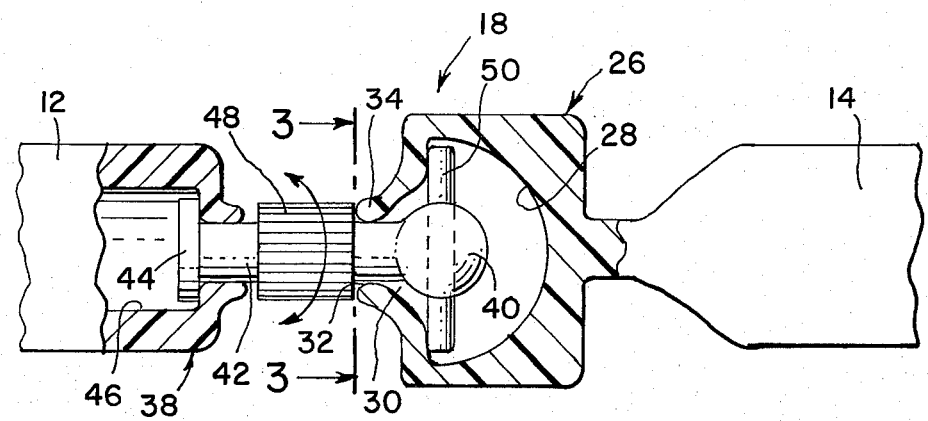
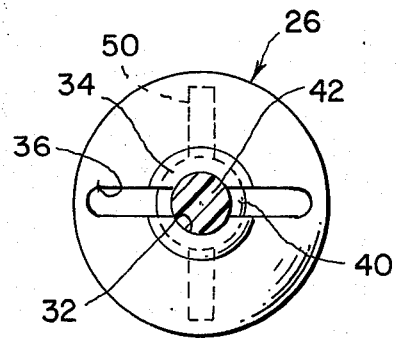

SAFETY CAT COLLAR

BACKGROUND OF THE INVENTION

This invention relates to a safety collar for animals, especially cats, and more particularly to such a collar which includes a fastener having a pressure releasable safety position and a conventional locked or leash position.

Identification and flea collars for pet animals are subject to the hazard of being caught or entangled on some projecting object during the animal's pursuit of adventure. Many a cat and dog have been strangled when its collar has been caught on brush in the woods, a tree, fence or similar object with no one around to free it. Conventional collars are choke collars and as the animal tries to free itself the collar further tightens.

This problem has been recognized and attempts to provide a safety collar have been made by the prior art. Examples of the known prior art are disclosed in U.S. Pat. Nos.: 2,612,139; 3,131,674; 3,011,478; and 3,589,341. With the expansion of U.S. Pat. No. 3,011,478 none of the prior art safety collars can also be used as a conventional choke collar for walking the animal on a leash. Those collars would release when the leash is tugged against the pull of the animal. In the disclosure of the excepted patent a chain having a sprial coupling with resilient arms is affixed to the other end. The coupling is passed through the ring and a leash may or may not be attached to the spiral coupling. If it is attached, the collar acts as a choke; if not, the collar acts as a safety collar since a force on the collar tends to decrease the separation between the arms until they pass through the ring to release the collar from the animal's neck. The spiral coupling must, however, be made of a spring-type metal which has the required elasticity, but which is a costly commodity.

SUMMARY OF THE INVENTION

The present invention provides an inexpensive safety collar having a fastener which will release upon the application to the collar of predetermined excessive force but which may also be employed as a conventional choke collar merely by turning an operator on the fastener. The fastener includes a socket having a restricted entrance including a radial slot opening into a cavity, and a ball larger than the entrance and including a radially disposed pin adapted to be received through the slot. The socket member is fixed to one end of a neck-encircling band, and the ball member pivotably extends from the other end of the band. With the pin and ball received within the socket cavity the fastener provides a safety collar by maintaining the alignment of the pin with slot. It provides a choke collar when the ball is turned so that the pin is approximately normal to the slot. Most, if not all, of the elements may comprise plastic material and would be inexpensive to manufacture, and the collar may be of the chemically treated variety to prevent fleas.

Accordingly, it is a primary object of the present invention to provide a novel inexpensive safety collar having a fastener that will release upon the application of a predetermined exceesive force and which may be employed as a conventional collar for use with a leash.

Another object of this invention is to provide a collar for cats and dogs having a fastener including a safety release position and a secured lock position.

BRIEF DESCRIPTION OF THE DRAWINGS

Other objects and features of the invention will best be understood upon reading the following detailed description of the invention together with the accompanying drawings, in which:

FIG. 1 is a perspective view of a collar and fastener therefor constructed in accordance with the principles of the present invention;

FIG. 2 is an enlarged fragmentary view partly in section of the fastener portion of the collar illustrated in FIG. 1;

FIG. 3 is a cross sectional view through the fastener taken substantially along line 3—3 of FIG. 2; and FIG. 4 is a fragmentary view partly in section of the collar adjusting means.

DESCRIPTION OF THE PREFERRED EMBODIMENT

Referring now to the drawings, FIG. 1 illustrates a collar constructed in accordance with the present invention and designated generally as 10. Preferably the collar comprises two plastic neck encircling bands 12 and 14 which may be chemically treated for eradicating fleas and may be secured together at first corresponding ends by adjustable means 16 and fastened at second corresponding ends by fastener 18. The adjustable means 16 may comprise a plurality of spaced eyelets 20 formed in band 14 and a bulb-like connecting pin 22 formed on band 12. Annular bosses 24 may be formed about the holes 20. The diameter of the bulb-like pin 22 is slightly larger than that of the eyelets which deform to allow the pin to be selectively inserted through the eyelets upon exertion of an axial force on the pin against the eyelet. A similar force is required to disconnect the means 16 for readjustment.

The fastener 18 comprises a female keeper member 26 having a socket or cavity 28 formed in an alignment in the end of the band 14. The keeper member 26 preferably may be molded with the band 14 and includes an aperture 30 opening into the cavity 28. The aperture 30 includes a circular portion 32 defined by an opening in a projecting annular lip 34 extending from the band end of the keeper and an elongated slot 36 radially intersecting the plane of the circular portion. The fastener 18 also includes a bolt member 38 comprising a ball element 40 preferably formed of plastic on one end of an integral shaft 42 having a disk 44 formed on the opposite end. The disk 44 is journaled within a cavity 46 formed on the free end of the band member 12 so that the disk together with the shaft 42 and the ball 40 may pivot on the axis of the band 12, but the disk in axially secured with the cavity 46. Thus, the bolt 38 pivots about an axis substantially normal to the aperture 30. The shaft 42, intermediate the disk 44 and the ball 40, includes a preferably knurled quarter operator 48 which can be grasped to turn the shaft. Mounted radially within the ball is a dowel or pin member 50. The ball 40 preferably is slightly larger in diameter than that of the circular portion 32 of the aperture so that the entrance to the cavity 28 is restricted and may deform or yield as the ball is inserted with an axial force. Furthermore, the pin 50 may be slightly larger than the slot 36 which will also yield to permit entry to the pin.

To insert the male bolt member 38 into the female keeper 26 the pin 50 is aligned with the slot 36. The ball 40 and the pin 50 are then pushed into the cavity 28. The collar in this condition acts as a safety collar since the ball and pin can be pulled through the aperture and slot upon the application of a predetermined excessive force to the collar, it for example the collar becomes caught on a projecting object. The predetermined force is of course dependent upon the difference in dimension between the ball 40 and the circular portion 32 of the aperture 30, and the difference in dimension between the pin 50 and the slot 36. To lock the fastener so that the collar may function as a conventional chock collar the operator 48 is turned approximately 90 degrees after the ball and pin are inserted into the cavity 28. This prevents the pin and therefor the ball from being pulled free from the cavity and secures the band 12 to the band 14 for employment of the collar for use with a leash.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what it claimed herein is:

1. A safety collar for a cat including a neck encircling band having a pressure releasable fastener, said fastener comprising a socket member carried by one end of said band and having a deformable aperture opening into an internal cavity, said aperture including a central hole and a slot disposed radially relative to said hole, a bolt member carried by the other end of said band, at least a portion of said bolt member having a shape corresponding to and slightly larger than that of the hole for restricted entry therethrough to be received in said cavity upon deformation of said socket member, a pin member disposed radially in said portion of the bolt member and having a shape corresponding to that of said slot, and means for pivotably mounting said bolt member for turning about an axis substantially normal to said aperture.

2. A safety collar for a cat including a neck encircling band having a pressure releasable fastener, said fastener comprising a socket member carried by one end of said band and having a deformable aperture opening into an internal cavity, said aperture including a central hole and a slot disposed radially relative to said hole, a bolt member comprising a ball secured to a shaft carried by the other end of said band, said ball having a shape corresponding to that of the hole for entry therethrough to be received in said cavity, a pin member disposed radially in said ball and having a shape corresponding to that of the slot, and means for pivotably mounting said ball for turning about an axis substantially normal to said aperture, said means comprising a recess formed in said other end of the band, and a member secured to said shaft and band and journalled in said recess.

3. A safety collar as recited in claim 2 wherein said socket member comprises a thermoplastic material and is integral with the band.

4. A safety collar as recited in claim 3 wherein the relative sizes of said ball and hole are such that said hole restricts the passage of the ball therethrough, and the relative sizes of said pin and slot are such that the slot restricts the passage of the pin therethrough.

5. A safety collar as recited in claim 2 wherein said band comprises two band elements each having a free end remote from the fastener, and adjustable means formed on each of said free ends for securing said free ends for varying the length of said band, said adjustable means comprises a bulbous member on one of said free ends and a plurality of spaced eyelets formed on the other of said free ends for selectively receiving said bulbous member, said bulbous member being larger than said eyelets and receivable therethrough only upon application of a force thereto in the direction of the eyelet axis.

* * * * *